United States Patent
Rozenblit et al.

(10) Patent No.: US 6,961,547 B2
(45) Date of Patent: Nov. 1, 2005

(54) WIRELESS TRANSMITTER INCORPORATING A SYNCHRONOUS OSCILLATOR IN A TRANSLATION LOOP

(75) Inventors: Dmitriy Rozenblit, Irvine, CA (US); William J. Domino, Yorba Linda, CA (US); Rahul Magoon, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 86 days.

(21) Appl. No.: 10/233,231

(22) Filed: Aug. 30, 2002

(65) Prior Publication Data

US 2004/0043728 A1 Mar. 4, 2004

(51) Int. Cl.$^7$ .......................... H01Q 11/12; H04B 1/04
(52) U.S. Cl. .......................... 455/118; 455/76; 455/86; 455/106; 455/75; 455/110; 455/102; 455/126; 455/180.3; 455/260; 332/103; 332/119; 330/149; 330/10; 375/216; 375/261; 375/224; 375/296
(58) Field of Search .................... 455/118, 73, 76, 455/75, 126, 102, 110, 106, 86; 332/103, 117, 119

(56) References Cited

U.S. PATENT DOCUMENTS

| | | | |
|---|---|---|---|
| 6,526,265 B1 * | 2/2003 | Damgaard et al. | 455/118 |
| 6,529,712 B1 * | 3/2003 | Domino et al. | 455/86 |
| 6,560,297 B1 * | 5/2003 | Broughton | 375/308 |
| 6,650,875 B1 * | 11/2003 | Rozenblit et al. | 455/91 |
| 6,658,065 B1 * | 12/2003 | Delta Torre et al. | 375/296 |
| 6,658,237 B1 * | 12/2003 | Rozenblit et al. | 455/83 |
| 6,671,500 B2 * | 12/2003 | Damgaard et al. | 455/118 |
| 6,731,693 B1 * | 5/2004 | Damgaard | 375/296 |

* cited by examiner

*Primary Examiner*—Marceau Milord
(74) *Attorney, Agent, or Firm*—Needle & Rosenberg, P.C.

(57) ABSTRACT

A translation loop signal upconverter is disclosed. Embodiments of the invention minimize $n^{th}$ order harmonics and spurious tones in the radio frequency output spectrum of a portable transceiver. In one embodiment, the invention is a signal upconverter, comprising a modulator configured to develop a modulated intermediate frequency (IF) signal at a fundamental frequency, the modulated IF signal also including a plurality of $n^{th}$ order components, a synchronous oscillator configured to receive the modulated IF signal, the synchronous oscillator also configured to operate at the fundamental frequency of the modulated IF signal, thereby providing an IF signal substantially free of the $n^{th}$ order components, and a translation loop having a phase locked loop, the translation loop configured to receive the IF signal output of the synchronous oscillator, and supply a radio frequency (RF) output signal to a power amplifier.

20 Claims, 3 Drawing Sheets

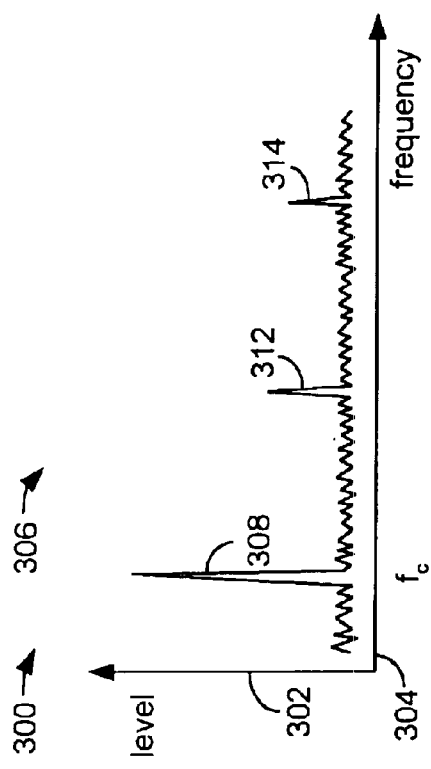
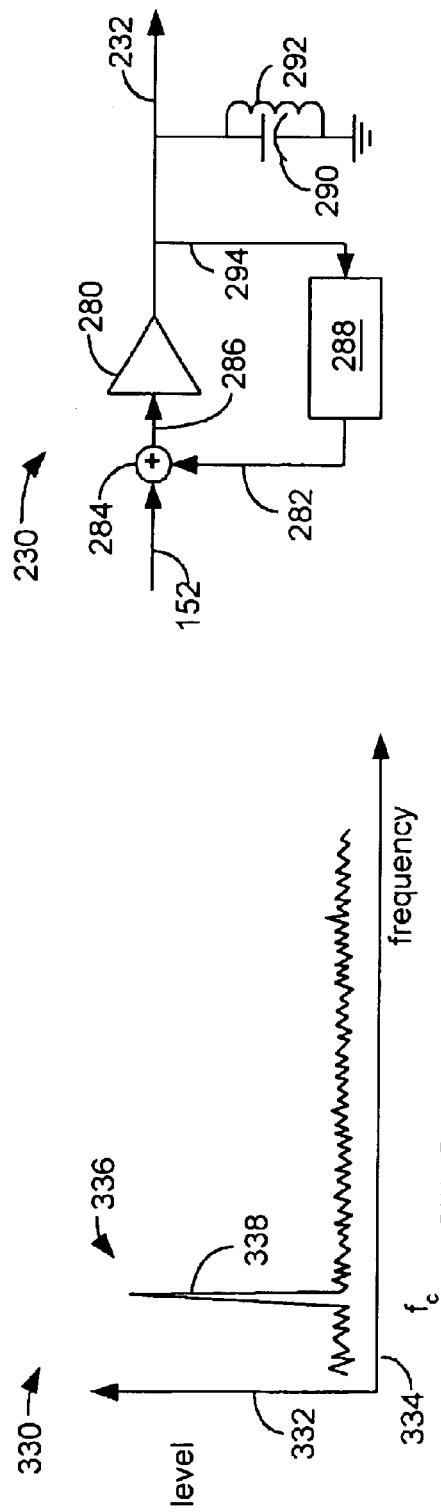
FIG. 2B
FIG. 3A
FIG. 3B

WIRELESS TRANSMITTER INCORPORATING A SYNCHRONOUS OSCILLATOR IN A TRANSLATION LOOP

BACKGROUND OF THE INVENTION

1. Field of the Invention

This invention relates generally to maximizing radio frequency transmission efficiency while minimizing spurious harmonic emission in a wireless communication device transmitter. More particularly, the invention relates to a wireless transmitter architecture that incorporates a synchronous oscillator to modify a transmit signal in a translation loop upconverter.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems have been developed and deployed, many different standards have evolved, to which these systems must conform. For example, in the United States, many portable communications systems comply with the IS-136 standard, which requires the use of a particular modulation scheme and access format. In the case of IS-136, the modulation scheme can be 8-quadrature phase shift keying (8QPSK), offset π/4 differential quadrature phase shift keying (π/4-DQPSK) or variations thereof, and the access format is TDMA.

In Europe, the global system for mobile communications (GSM) standard requires the use of the gaussian minimum shift keying (GMSK) modulation scheme in a narrow band TDMA access environment, which uses a constant envelope modulation methodology.

Furthermore, in a typical GSM mobile communication system using narrow band TDMA technology, a GMSK modulation scheme supplies a low noise phase modulated (PM) transmit signal to a non-linear power amplifier directly from an oscillator. In such an arrangement, a highly efficient, non-linear power amplifier can be used thus allowing efficient modulation of the phase-modulated signal and minimizing power consumption. Because the modulated signal is supplied directly from an oscillator, the need for filtering, either before or after the power-amplifier, is minimized. Further, the output in a GSM transceiver is a constant envelope (i.e., a non time-varying amplitude) modulation signal.

The dominant transmitter architecture for GSM compliant devices is known to those having ordinary skill in the art as an "upconversion loop," or a "translation loop." Typically, the translation loop is supplied with a modulated intermediate frequency (IF) signal from an in-phase (I)/quadrature (Q) (IQ) modulator.

Unfortunately, due to imperfect gain and phase imbalance, an IQ modulator emits undesired signals, in the form of local oscillator (LO) signal leakage and opposite sideband components. Further, an IQ modulator emits IF carrier harmonics that are modulated by the fundamental I and Q signals supplied by the IQ modulator.

An IQ modulator also emits harmonics at the third and fifth multiples (sometimes called "overtones" or $n^{th}$ order harmonics) of the IF carrier frequency. These third and fifth order harmonics cause spurious tones to appear in the radio frequency (RF) output signal in the vicinity of the carrier center frequency after being upconverted to the RF frequency by the translation loop. The unwanted spurious tones add to the phase error of the transmit signal and increase undesired spectral output in the vicinity of the carrier frequency.

The presence of the undesired spurious tones in the vicinity of the carrier frequency can cause the output of a GSM transmitter to violate the strict modulation spectrum standard present in GSM. This standard is commonly referred to in the industry as a "modulation mask" specification.

Reducing the LO signal leakage and the opposite sideband components is typically accomplished by calibrating the IQ modulator during the final stages of production of the portable transceiver. Unfortunately, this does not completely resolve the problems in the IQ modulator and could increase the cost of the portable transceiver.

The spurious tones caused by the third and fifth order harmonics can be reduced before reaching the translation loop by incorporating an IF filter at the output of the IQ modulator. Unfortunately, such a filter requires many passive electrical components and, due to the complexity of the filter and associated manufacturing difficulties, the filter is generally placed on a different chip (i.e., on a substrate other than the substrate on which the transmit circuitry is fabricated). Further, such a filter achieves only moderate performance improvement, and the resulting transmit circuitry may still violate the strict modulation spectrum standard present in GSM.

Therefore it would be desirable to provide a transmit architecture for a portable transceiver that is economical to manufacture and that exhibits a superior output signal characteristic.

SUMMARY

Embodiments of the invention include a translation loop transmitter architecture that includes a synchronous oscillator. Embodiments of the invention minimize $n^{th}$ order fundamentally modulated harmonics and spurious tones in the radio frequency (RF) output spectrum of a portable transceiver. In one embodiment, the invention is a signal upconverter, comprising a modulator configured to develop a modulated intermediate frequency (IF) signal at a fundamental frequency, the modulated IF signal also including a plurality of modulated $n^{th}$ order components, a synchronous oscillator configured to receive the modulated IF signal, the synchronous oscillator also configured to operate at the fundamental frequency of the modulated IF signal, thereby providing an IF signal substantially free of the modulated $n^{th}$ order components, and a translation loop having a phase locked loop, the translation loop configured to receive the IF signal output of the synchronous oscillator, and supply a radio frequency output signal to a power amplifier.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 2B is a schematic diagram illustrating one implementation of the synchronous oscillator of FIG. 2A.

FIG. 3A is a graphical view illustrating an example frequency spectrum of the modulated IF signal of FIG. 2A.

FIG. 3B is a graphical view illustrating an example frequency spectrum of the output of the translation loop of FIG. 2A

DETAILED DESCRIPTION

Figure 1:
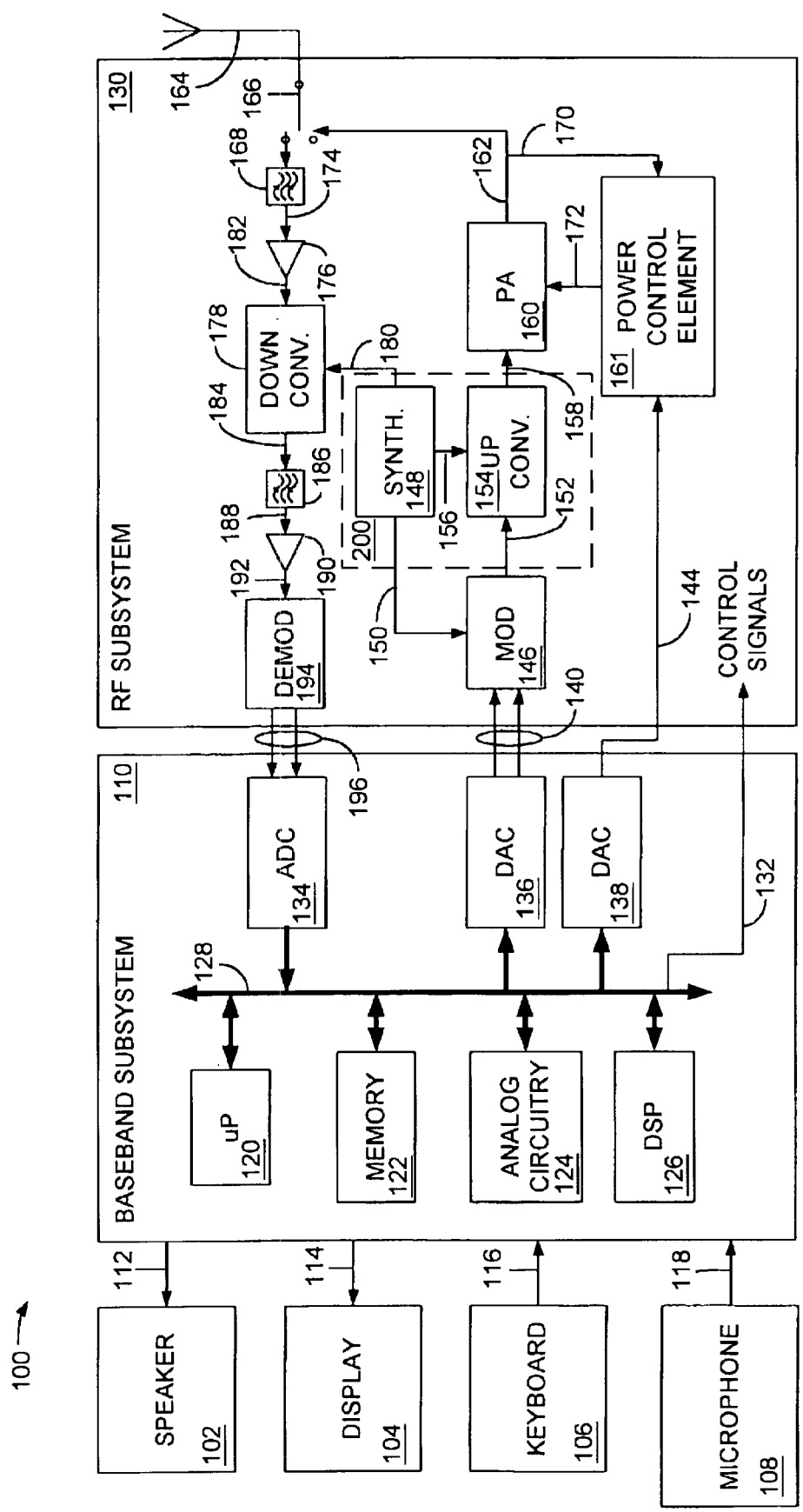
FIG. 1 is a block diagram illustrating a simplified portable transceiver.

Although described with particular reference to a portable transceiver, the synchronous oscillator fed translation loop transmit architecture can be implemented in any system that uses a constant envelope power output modulation scheme. Further, the synchronous oscillator fed translation loop transmit architecture can also be implemented in a non-constant envelope modulation system when the amplitude modulation (AM) component is added after the translation loop (to be described below). Furthermore, the synchronous oscillator fed translation loop transmitter architecture is applicable to any transmitter in which a phase modulated (PM) signal is supplied to a linear power amplifier. For simplicity in the description to follow, the synchronous oscillator fed translation loop transmit architecture will be referred to below as the "synchronous oscillator transmit architecture."

The synchronous oscillator transmit architecture can be implemented in software, hardware, or a combination of software and hardware. Selected portions of the synchronous oscillator transmit architecture may be implemented in hardware and software. The hardware portion of the invention can be implemented using specialized hardware elements and logic. The software portion can be stored in a memory and be executed by a suitable instruction execution system (microprocessor). The hardware implementation of the synchronous oscillator transmit architecture can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

The software of the synchronous oscillator transmit architecture comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 1 is a block diagram illustrating a simplified portable transceiver 100. Portable transceiver 100 includes speaker 102, display 104, keyboard 106, and microphone 108, all connected to baseband subsystem 110. In a particular embodiment, portable transceiver 100 can be, for example but not limited to, a portable telecommunication handset such as a mobile/cellular-type telephone. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor ($\mu$P) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110. Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to radio frequency (RF) subsystem 130 via connection 132. Although shown as a single connection 132, the control signals may originate from DSP 126 or from microprocessor 120, and are supplied to a variety of points within RF subsystem 130. It should be noted that, for simplicity, only the basic components of portable transceiver 100 are illustrated herein.

Baseband subsystem 110 also includes analog-to-digital converter (ADC) 134 and digital-to-analog converters (DACs) 136 and 138. Although DACs 136 and 138 are illustrated as two separate devices, it is understood that a single digital-to-analog converter may be used that performs the function of DACs 136 and 138. ADC 134, DAC 136 and DAC 138 also communicate with microprocessor 120, memory 122, analog circuitry 124 and DSP 126 via bus 128. DAC 136 converts the digital communication information within baseband subsystem 110 into an analog signal for transmission to RF subsystem 130 via connection 140. DAC 138 provides a reference voltage power level signal to power control element 161 via connection 144. Connection 140, while shown as two directed arrows, includes the information that is to be transmitted by RF subsystem 130 after conversion from the digital domain to the analog domain.

RF subsystem 130 includes modulator 146, which, after receiving a frequency reference signal, also called a "local oscillator" signal, or "LO," from synthesizer 148 via connection 150, modulates the received analog information and provides a modulated signal via connection 152 to upconverter 154. In a constant envelope modulation methodology, the modulated transmit signal generally includes only phase information. Upconverter 154 also receives a frequency reference signal from synthesizer 148 via connection 156. Synthesizer 148 determines the appropriate frequency to which the upconverter 154 upconverts the modulated signal on connection 152. As will be described in detail below, the synthesizer 148 and the upconverter 154, along with other components to be described below, form the synchronous oscillator transmit architecture that is capable of supplying an intermediate frequency (IF) modulated signal that is substantially free of spurious tones caused by modulated $n^{th}$ order harmonics that can be generated by the modulator 146. The synchronous oscillator transmit architecture 200 can be used to upconvert constant envelope and non-constant envelope modulation formats. Further, as will be described below, the synchronous oscillator transmit architecture uses a voltage controlled oscillator to provide a low noise upconverted radio frequency (RF) signal to an efficient non-linear power amplifier 160.

Upconverter 154 supplies the modulated signal via connection 158 to power amplifier 160. Power amplifier 160 amplifies the modulated signal on connection 158 to the appropriate power level for transmission via connection 162 to antenna 164. Illustratively, switch 166 controls whether the amplified signal on connection 162 is transferred to antenna 164 or whether a received signal from antenna 164 is supplied to filter 168. The operation of switch 166 is controlled by a control signal from baseband subsystem 110 via connection 132. Alternatively, the switch 166 may be replaced by a filter pair (e.g., a diplexer) that allows simultaneous passage of both transmit signals and receive signals, as known to those having ordinary skill in the art.

A portion of the amplified transmit signal energy on connection 162 is supplied via connection 170 to power control element 161. Power control element 161 may form a closed power control feedback loop to control the output power of power amplifier 160 and may also supply a power control feedback signal via connection 172.

A signal received by antenna 164 will be directed to receive filter 168. Receive filter 168 will filter the received signal and supply the filtered signal on connection 174 to low noise amplifier (LNA) 176. Receive filter 168 is a band pass filter, which passes all channels of the particular cellular system in which the portable transceiver 100 is operating. As an example, for a 900 MHz GSM system, receive filter 168 would pass all frequencies from 935.2 MHz to 959.8 MHz, covering all 124 contiguous channels of 200 kHz each. The purpose of this filter is to reject all frequencies outside the desired region. LNA 176 amplifies the very weak signal on connection 174 to a level at which downconverter 178 can translate the signal from the transmitted frequency back to a baseband frequency. Alternatively, the functionality of LNA 176 and downconverter 178 can be accomplished using other elements, such as, for example but not limited to, a low noise block downconverter (LNB).

Downconverter 178 receives a frequency reference signal, also called a "local oscillator" signal, or "LO," from synthesizer 148, via connection 180, which signal instructs the downconverter 178 as to the proper frequency to which to downconvert the signal received from LNA 176 via connection 182. The downconverted frequency is called the intermediate frequency or IF. Downconverter 178 sends the downconverted signal via connection 184 to channel filter 186, also called the "IF filter." Channel filter 186 filters the downconverted signal and supplies it via connection 188 to amplifier 190. The channel filter 186 selects the one desired channel and rejects all others. Using the GSM system as an example, only one of the 124 contiguous channels is actually to be received. After all channels are passed by receive filter 168 and downconverted in frequency by downconverter 178, only the one desired channel will appear precisely at the center frequency of channel filter 186. The synthesizer 148, by controlling the local oscillator frequency supplied on connection 180 to downconverter 178, determines the selected channel. Amplifier 190 amplifies the received signal and supplies the amplified signal via connection 192 to demodulator 194. Demodulator 194 recovers the transmitted analog information and supplies a signal representing this information via connection 196 to ADC 134. ADC 134 converts these analog signals to a digital signal at baseband frequency and transfers the signal via bus 128 to DSP 126 for further processing.

Figure 2A:
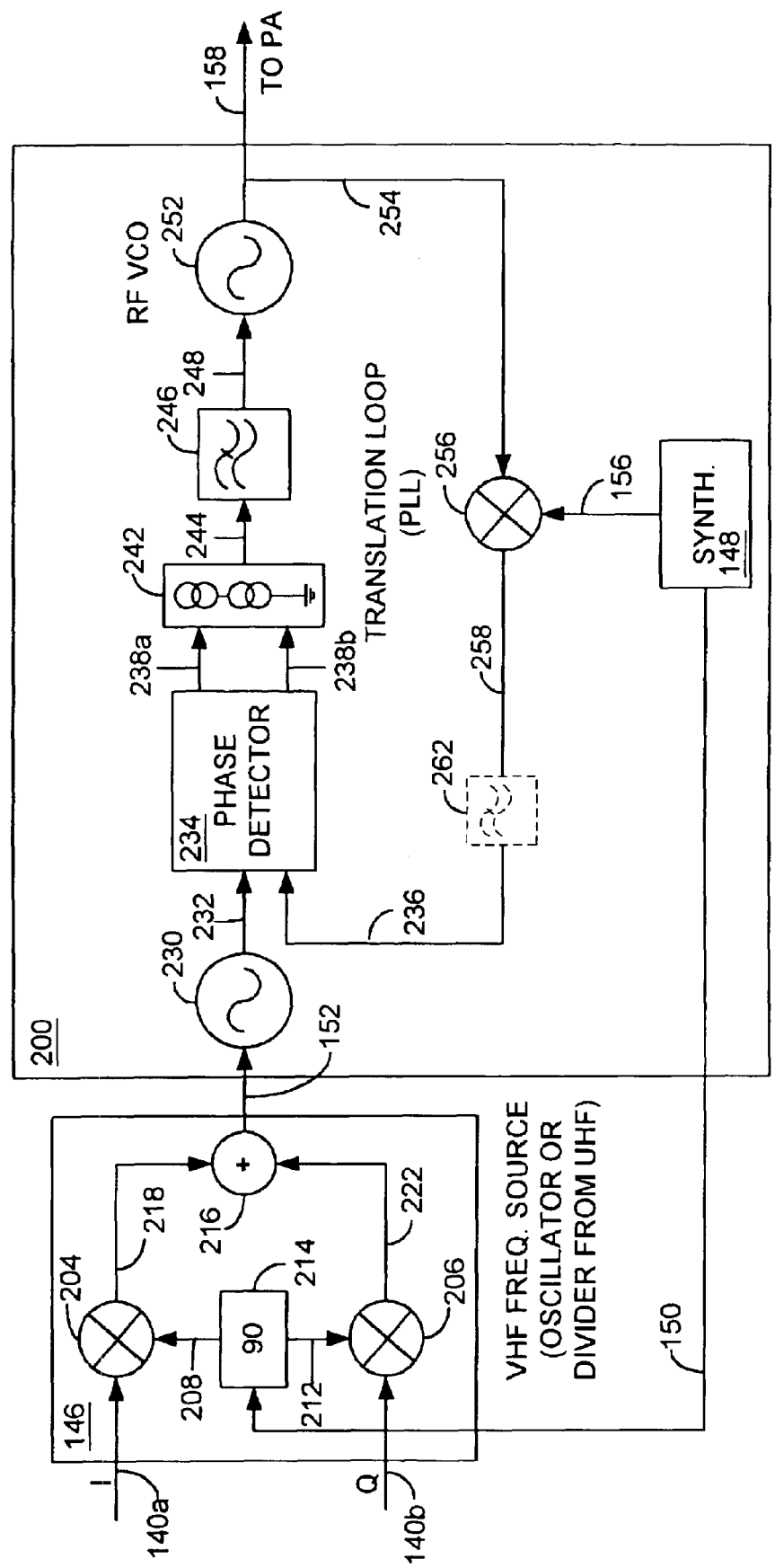
FIG. 2A is a block diagram illustrating the synchronous oscillator transmit architecture of FIG. 1.

FIG. 2A is a block diagram illustrating the synchronous oscillator transmit architecture 200 of FIG. 1. In the example embodiment illustrated in FIG. 2A, the modulator 146 is an in-phase/quadrature (I/Q) modulator.

The modulator 146 includes a phase shifter 214, which receives a very high frequency (VHF) signal on connection 150. For example, the VHF signal source may be the synthesizer 148 of FIG. 1 that supplies an LO signal on connection 150. The phase shifter 214 shifts the phase of the signal on connection 150 by 90 degrees, and supplies outputs via connections 208 and 212 to rotators 204 and 206, respectively. The in-phase (I) component of the transmit signal is supplied via connection 140a to rotator 204 and the quadrature (Q) component of the signal is supplied via connection 140b to rotator 206. The output of rotator 204 is the modulated phase-rotated in-phase component of the transmit signal and is supplied on connection 218 to adder 216. The output of rotator 206 is the modulated phase-rotated quadrature component of the transmit signal and it is supplied on connection 222 to adder 216. The adder 216 combines the signals on connections 218 and 222 and supplies the combined modulated transmit signal via connection 152 to synchronous oscillator 230.

In accordance with an embodiment of the invention, the synchronous oscillator 230, which is sometimes referred to as an "injection-locked" oscillator, acts as a regenerative receiver. The synchronous-oscillator 230 exhibits a narrow capture ratio where only the strongest frequency tone on connection 152 (i.e., the fundamental frequency of the modulated IF signal) will drive the synchronous oscillator 230. In accordance with this embodiment of the invention, the synchronous oscillator 230 will reject all other frequency tones (i.e., any $n^{th}$ order harmonic signals and modulated $n^{th}$ order harmonic signals that may promote spurious tones) in the modulated IF signal on connection 152. Essentially, the synchronous oscillator 230 becomes a highly effective "tracking filter" that tracks the instantaneous frequency of the strongest signal component on connection 152 (i.e., the fundamental frequency of the modulated IF signal) while rejecting any spurious tones present on the signal on connection 152. In this manner, the synchronous oscillator provides a filter function without a complicated filter structure.

The synchronous oscillator 230 can be implemented as a positive feedback amplifier operating in near-oscillation mode. The amplifier oscillates at the frequency (i.e., the fundamental frequency) of the output of the modulator 146 on connection 152. This embodiment will be described in detail below. Furthermore, the synchronous oscillator 230 can easily be incorporated onto the same device that houses the other components described herein, and consumes very little space.

The signal on connection 232 is supplied to a phase detector 234. The phase detector 234 compares the phase of the signals supplied on connections 232 and 236 and supplies a pair of signals representing the relative phase of the signals on connections 232 and 236. The output of the phase detector 234 is supplied as voltage pulses on connections 238a and 238b. The charge pump 242 converts the voltage signals on connections 238a and 238b into current pulses on connection 244. Generally, the charge pump 242 includes two current sources (not shown) where only one is active at a time. The charge pump 242 provides current pulses as output on connection 244. The pulse width of these pulses is proportional to the relative phase between the signals on connections 232 and 236.

The output of the charge pump 242 is supplied via connection 244 to a low-pass filter 246, sometimes referred to as a "loop filter." The low-pass filter 246 filters the signal on connection 244 and passes a signal that is essentially DC plus a small component at the baseband modulation frequency on connection 248 to transmit (TX) voltage controlled oscillator (VCO) 252. The TX VCO 252 supplies a low noise, clean, phase-modulated signal (i.e., a signal with a very low out-of-band noise) via connection 158 to the power amplifier 160 (FIG. 1). By using a voltage controlled oscillator 252 to supply a low noise modulated signal, the need for filtering before and after the power amplifier (160 of FIG. 1) may be reduced or eliminated. Furthermore, in this manner, a highly-efficient, non-linear power amplifier (160 of FIG. 1) can be used.

The output of the TX VCO 252 also forms an input on connection 254 to an upconversion mixer 256. The upconversion mixer 256 receives an ultra high frequency (UHF) LO signal via connection 156 from the synthesizer 148. The upconversion mixer 256 combines the portion of the output of the TX VCO 252 on connection 254 with the output of the synthesizer 148 (i.e., the local oscillator signal) supplied via connection 156. The output of the upconversion mixer 256 is then communicated via connection 258 to the phase detector 234. Optionally, the signal on connection 258 is supplied to a low pass filter 262, which reduces any spurious emission that may be introduced to the signal by the upconversion mixer 256. If employed, the low pass filter 262 supplies the filtered signal on connection 236 to the phase detector 234.

The phase detector 234 detects any phase difference between the modulated IF signal on connection 232 and the output of the upconversion mixer 256 on connection 258, thus ensuring that the frequency of the output signal of the phase detector 234 on connection 238 is defined by the frequency of the local oscillator signal supplied by the synthesizer 148. In this manner, the connection 254, the synthesizer 148, the mixer 256 and the connection 258 form a translation loop including a phase locked loop (PLL), which is used to determine the transmit frequency to which the signal on connection 232 is upconverted. For example, the synthesizer 148 and the mixer 256 ensure that the frequency of the signal output from the TX VCO 252 on connection 158 tracks that of the local oscillator signal supplied by the synthesizer 148.

FIG. 2B is a schematic diagram illustrating one implementation of the synchronous oscillator 230 of FIG. 2A. The synchronous oscillator 230 comprises an amplifier 280 and a feedback network 288. The modulated IF transmit signal from the modulator 146 on connection 152 is supplied to an adder 284. The output of the adder 284 is supplied over connection 286 to the input of the amplifier 280. The output of the amplifier 280 on connection 232 is directed to connection 294, where it is supplied to the feedback network 288. The output of the feedback network 288 is supplied via connection 282 to the adder 284. The gain (referred to as the "loop gain") of the amplifier 280 (referred to as "A") and the gain of the feedback network 288 (referred to as "B") should equal approximately unity. That is the gain of the amplifier 280 and the feedback network 288 should equal approximately 1. If the gain were greater than 1, the synchronous oscillator 230 would oscillate on its own, which is not desired. With the loop gain just less than 1, the circuit is close to oscillation. With A×B=1−Δ, where Δ is a small number (e.g., 0.01), the overall gain of the synchronous oscillator 230 is A/Δ which is a very large gain.

The capacitor 290 and the inductor 292 located on connection 232 at the output of the amplifier 280 form a tuning circuit. The bandwidth of the tuning circuit should be wide enough to pass all desired IF frequencies. As an example, the IF might vary by +/−10% so the tuned circuit should have a bandwidth of more than 20% of its center frequency. This high-gain tuned amplifier will tend to oscillate when it is stimulated by the input signal on connection 152. The natural frequency at which the synchronous oscillator 230 tends to oscillate is roughly the same as the frequency (i.e. within 10%) of the input signal on connection 152. Further, the gain is sufficiently large so that the output amplitude increases to system voltage, effectively eliminating any amplitude noise or other unwanted tones riding on the oscillator signal.

The amplifier 280 is responsive to the strongest signal present at its input on connection 152 (i.e., the fundamental frequency of the modulated IF signal). Accordingly, the amplifier 280 will oscillate at the fundamental frequency of the modulated IF signal and reject all other frequencies. In this manner, the amplifier 280 becomes a very effective filter that suppresses all $n^{th}$ order harmonic frequencies (and therefore, all spurious tones) on connection 152.

FIG. 3A is a graphical view illustrating an example frequency spectrum 300 of the modulated IF signal on connection 152 (see FIG. 2A). The vertical axis 302 represents signal level and the horizontal axis 304 represents frequency. The signal trace 306 represents the signal spectrum of the modulated IF signal on connection 152. The signal trace 306 includes a large spike 308 centered at the fundamental frequency ($f_C$) of the signal on connection 152. However, as shown in the signal trace 306, a number of $n^{th}$ order signal components, two of which are illustrated using reference numerals 312 and 314, are present in the signal spectrum in the vicinity of the spike 308. These $n^{th}$ order components, commonly referred to as harmonics, are a byproduct of the operation of the modulator 146. The harmonics 312 and 314 typically occur at odd multiples of the fundamental frequency, and, in this example, are typically referred to as third order harmonics and fifth order harmonics, respectively.

The most troublesome spurious effects are generally caused by modulated harmonics. For example, if the unmodulated IF carrier is $F_{IF}$ (e.g., 100 MHz) and the baseband signal is $F_{MOD}$ (e.g, 100 kHz), then the desired modulation provides a tone at ($F_{IF}+F_{MOD}$), and the pure harmonics of this tone occur at ($3_{IF}+3F_{MOD}$) and ($5F_{IF}+5F_{MOD}$) However, these harmonics generally do not cause a problem, and in fact even the synchronous oscillator 230 will have these harmonics present to some degree. The real problem frequencies are the "modulated harmonics," which occur at ($3F_{IF}-F_{MOD}$) and ($5F_{IF}+F_{MOD}$). These odd harmonics of the carrier are each modulated by only the +/−$F_{MOD}$, not $3F_{MOD}$ or $5F_{MOD}$. These odd harmonics are a typical product of an IQ modulator. The IQ modulator first creates the harmonics of the carrier, and then modulates the carrier and each of its harmonics with $F_{MOD}$. The sign of the modulation frequency inverts with every harmonic, resulting in ($F_{IF}+F_{MOD}$), ($3F_{IF}-F_{MOD}$), ($5F_{IF}+F_{MOD}$), ($7F_{IF}-F_{MOD}$), ($9F_{IF}+F_{MOD}$), etc. The $7^{th}$ order harmonics and above are usually weak enough to ignore.

Unfortunately, these modulated harmonic signals give rise to spurious tones in the signal spectrum and, if left uncorrected, will propagate through the transmit architecture (FIG. 2A) and cause spurious tones at the output of the TX VCO 252. The energy contained in these spurious tones will then be amplified by the power amplifier 160 and will likely cause a GSM based transmitter to exceed its allowed output spectrum characteristic, referred to above as the modulation mask.

FIG. 3B is a graphical view illustrating an example frequency spectrum 330 of the output of the TX VCO 252 after the modulated IF signal has passed through the synchronous oscillator 230 and the translation loop components in the synchronous oscillator transmit architecture 200. The vertical axis 332 represents signal level and the horizontal axis 334 represents frequency. The signal trace 336 represents the signal spectrum of the upconverted modulated signal (i.e., the RF signal) on connection 158 (FIG. 2). The signal trace 336 includes a spike 338 centered at the fundamental frequency $f_C$, but, as shown in FIG. 3B, the $n^{th}$ order harmonic signals are significantly suppressed. As described above, the $n^{th}$ order harmonics are suppressed due to the operation of the synchronous oscillator 232, which is responsive only to the strongest signal on connection 152 (i.e., the signal at the fundamental frequency $f_C$). The synchronous oscillator 230 rejects all $n^{th}$ order harmonics, thereby allowing the synchronous oscillator transmit architecture 200 to provide a low noise modulated radio frequency signal while eliminating the need for a complex filter located at the output of the modulator 146.

While various embodiments of the invention have been described, it will be apparent to those of ordinary skill in the art that many more embodiments and implementations are possible that are within the scope of this invention. Accordingly, the invention is not to be restricted except in light of the following claims and their equivalents.

What is claimed is:

1. A method for signal up-conversion, comprising:
providing a modulated intermediate frequency (IF) signal at a fundamental frequency, the modulated IF signal also including a plurality of $n^{th}$ order components;
providing the modulated IF signal to a synchronous oscillator located in a transmitter, the synchronous oscillator operating at the fundamental frequency of the modulated IF signal, thereby providing an IF signal substantially free of the $n^{th}$ order components; and
providing the IF output of the synchronous oscillator to a translation loop having a phase locked loop, the translation loop configured to supply a radio frequency (RF) output signal to a power amplifier.

2. The method of claim 1, wherein the modulator is an in-phase/quadrature (I/Q) modulator.

3. The method of claim 1, wherein the synchronous oscillator is an amplifier having positive feedback and that operates in an oscillation mode.

4. The method of claim 1, wherein the synchronous oscillator performs the step of rejecting signals at frequencies other than the fundamental frequency of the modulated IF signal.

5. The method of claim 1, wherein the modulated IF signal is a phase modulated signal.

6. A signal upconverter, comprising:
a modulator configured to develop a modulated intermediate frequency (IF) signal at a fundamental frequency, the modulated IF signal also including a plurality of $n^{th}$ order components;
a synchronous oscillator located in a transmitter and configured to receive the modulated IF signal, the synchronous oscillator also configured to operate at the fundamental frequency of the modulated IF signal, thereby providing an IF signal substantially free of the $n^{th}$ order components; and
a translation loop having a phase locked loop, the translation loop configured to receive the IF signal output of the synchronous oscillator and supply a radio frequency (RF) output signal to a power amplifier.

7. The upconverter of claim 6, wherein the modulator is an in-phase/quadrature (I/Q) modulator.

8. The upconverter of claim 6, wherein the synchronous oscillator is an amplifier having positive feedback and that operates in an oscillation mode.

9. The upconverter of claim 6, wherein the synchronous oscillator rejects signals at frequencies other than the fundamental frequency of the modulated IF signal.

10. The upconverter of claim 6, wherein the modulated IF signal is a phase modulated signal.

11. A system for transmit signal upconversion in a portable cellular transceiver, comprising:
a modulator configured to generate a modulated intermediate frequency (IF) signal;
a synchronous oscillator located in a transmitter and configured to receive the modulated IF signal and supply a substantially spurious tone free modulated IF signal; and
a translation loop upconverter configured to receive the substantially spurious tone free modulated IF signal and upconvert the substantially spurious tone free modulated IF signal to a substantially spurious tone free radio frequency (RF) modulated signal.

12. The system of claim 11, wherein the modulator is an in-phase/quadrature (I/Q) modulator.

13. The system of claim 12, wherein the synchronous oscillator is an amplifier having positive feedback and that operates in an oscillation mode.

14. The system of claim 11, wherein the synchronous oscillator rejects signals at frequencies other than the fundamental frequency of the modulated IF signal.

15. The system of claim 11, wherein the modulated IF signal is a phase modulated signal.

16. A system for signal up-conversion in a portable transceiver, comprising:
modulation means for providing a modulated intermediate frequency (IF) signal at a fundamental frequency, the modulated IF signal also including a plurality of $n^{th}$ order components;
suppression means, integrated with the modulation means, for providing an IF signal substantially free of the $n^{th}$ order components; and
upconversion means, integrated with the modulation means and the suppression means, for upconverting the modulated IF signal to a radio frequency (RF) output signal.

17. The system of claim 16, wherein the modulation means comprises an in-phase/quadrature (I/Q) modulator.

18. The system of claim 16, wherein the suppression means comprises an amplifier having positive feedback and that operates in an oscillation mode.

19. The system of claim 16, wherein the suppression means rejects signals at frequencies other than a fundamental frequency of the modulated IF signal.

20. The system of claim 16, wherein the modulation means provides a phase modulated signal.

* * * * *